US011213116B2

(12) United States Patent
Fleury

(10) Patent No.: US 11,213,116 B2
(45) Date of Patent: Jan. 4, 2022

(54) CELLULAR PHONE CASING AND CASING ACCESSORY HAVING A MEANS FOR HOLDING BY WAY OF A COMPLIANT MECHANISM

(71) Applicant: Michel Fleury, Laval (CA)

(72) Inventor: Michel Fleury, Laval (CA)

( * ) Notice: Subject to any disclaimer, the term of this patent is extended or adjusted under 35 U.S.C. 154(b) by 0 days.

(21) Appl. No.: 16/816,253

(22) Filed: Mar. 12, 2020

(65) Prior Publication Data

US 2021/0282538 A1 Sep. 16, 2021

(30) Foreign Application Priority Data

Mar. 19, 2019 (GB) ........................ 1903761

(51) Int. Cl.
*A45F 5/10* (2006.01)
*A45C 11/00* (2006.01)

(52) U.S. Cl.
CPC ............... *A45F 5/10* (2013.01); *A45C 11/00* (2013.01); *A45C 2011/002* (2013.01); *A45F 2200/0516* (2013.01)

(58) Field of Classification Search
CPC ...... A45F 5/10; A45F 2200/0516; A45F 5/00; A45F 2005/008; A45C 11/00; A45C 2011/002; H04M 1/0281; H04M 1/04; H04M 1/18; H04M 1/185; H04M 1/6041; H04B 1/385; H04B 1/3888; A44C 9/0061
USPC ........................................ 455/575.6; 294/142
See application file for complete search history.

(56) References Cited

U.S. PATENT DOCUMENTS

| 8,770,403 | B2 | 7/2014 | Kuo | |
|---|---|---|---|---|
| D735,695 | S | 8/2015 | Murphy | |
| 9,167,062 | B1* | 10/2015 | Leibenhaut | H04M 1/6041 |
| 9,314,078 | B1* | 4/2016 | Haymond | A45C 11/00 |
| 9,351,552 | B1 | 5/2016 | McNeil et al. | |
| 10,355,734 | B1* | 7/2019 | Otmani | H04B 1/3888 |
| 2005/0205623 | A1 | 9/2005 | Buntain | |
| 2010/0294405 | A1 | 11/2010 | Longinotti-Buitoni | |
| 2013/0140837 | A1* | 6/2013 | Carroll | F16M 13/04 294/142 |
| 2013/0270851 | A1* | 10/2013 | Konyha | F16M 13/04 294/142 |
| 2014/0152034 | A1 | 6/2014 | Tussy | |
| 2014/0227026 | A1* | 8/2014 | O'Neill | G03B 17/08 403/322.4 |
| 2014/0259538 | A1* | 9/2014 | Bransfield | A45F 5/00 24/3.13 |
| 2016/0049983 | A1* | 2/2016 | Ripka | H04M 1/04 455/575.6 |
| 2016/0150861 | A1* | 6/2016 | Yao | H04B 1/3888 224/245 |
| 2017/0328514 | A1 | 11/2017 | Cavalcante | |

(Continued)

*Primary Examiner* — Tan H Trinh

(57) ABSTRACT

A means for holding fingers for use with a cell phone has a first and a second set of cut patterns made into a compliant resiliently deformable material are configured for modifying the material so as to form an arcuate shape allowing an intended user's fingers to engage the means for holding fingers. The first cutting is made by removing material so as to create two generally parallel and generally elliptical openings; the second cuttings are located on opposite ends of the finger holder and are created by removing material so as to form a pair of identical—in a mirror image fashion—semi-circular shapes.

6 Claims, 3 Drawing Sheets

(56) References Cited

U.S. PATENT DOCUMENTS

2018/0302114 A1* 10/2018 Nielsen .................... A45F 5/10
2020/0170392 A1* 6/2020 Freimuth ............... A45C 11/00

* cited by examiner

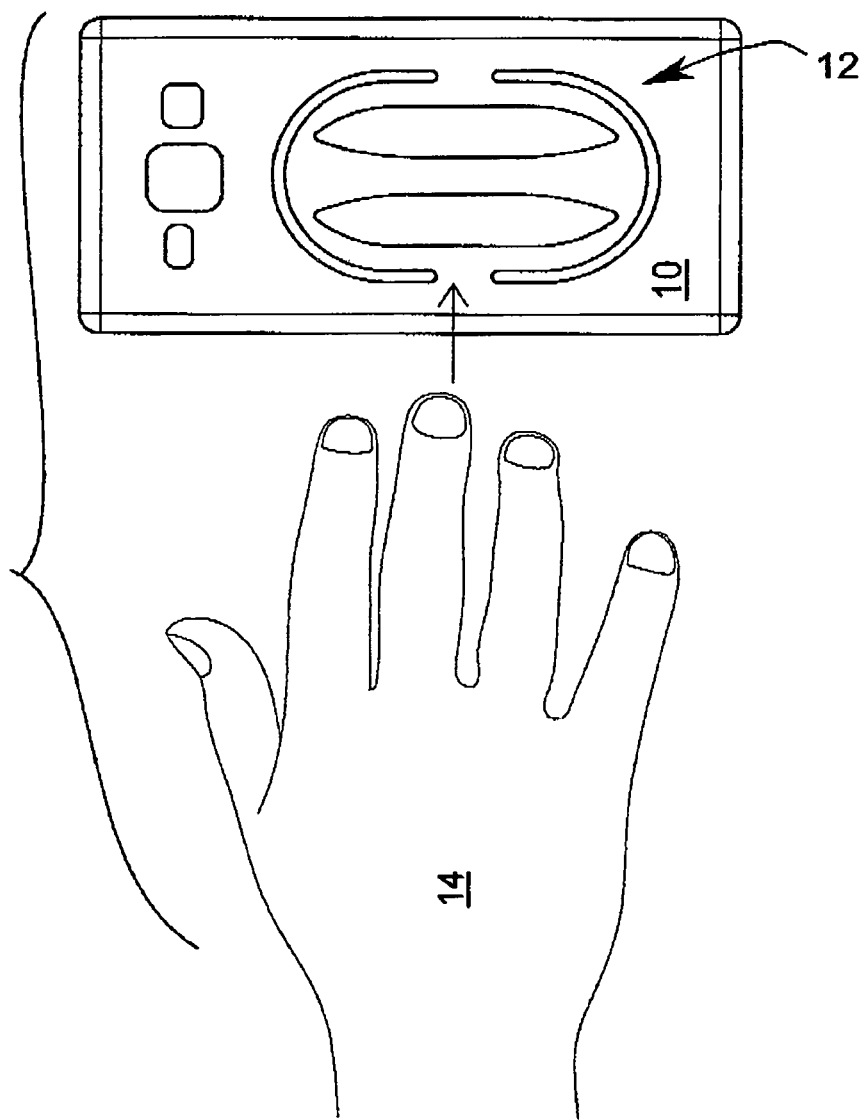

CELLULAR PHONE CASING AND CASING ACCESSORY HAVING A MEANS FOR HOLDING BY WAY OF A COMPLIANT MECHANISM

CROSS-REFERENCE TO RELATED APPLICATIONS

The present application claims priority to request for a patent number GB1903761.3, filed on Mar. 22, 2019 entitled "Cellular phone casing and casing accessory having a means for holding by way of a compliant mechanism", the disclosure of which is hereby incorporated in its entirety at least by reference.

BACKGROUND OF THE INVENTION

1. Field of the Invention

The present invention relates generally to a cellular phone casing but more particularly to a cellular phone casing and casing accessory having a means for holding by way of a compliant mechanism.

2. Description of Related Art

Along with the popularity of smartphone and their large screen came the popularity of casing to protect that large investment. As a further measure of safety, some casing come with finger hooks or else, stick on finger hooks are sold as accessory for smart phones. Sometimes it is simply because some phones are quite large and some users have small hands which makes it hard to securely hold the phone, especially when touching and swiping the screen. The problem with some of those handles and finger hooks is that they protrude from the casing, which adds thickness to the already thickened phone with its casing.

BRIEF SUMMARY OF THE INVENTION

It is a main object of the present disclosure to provide for a cellular phone casing or alternatively a casing accessory having a means for holding by way of a compliant mechanism In order to do so, there is provided a means for holding fingers for use with a cell phone having a first and a second set of cut patterns made into a compliant resiliently deformable material are configured for modifying the material so as to form an arcuate shape allowing an intended user's fingers to engage the means for holding fingers. The first cutting is made by removing material so as to create two generally parallel and generally elliptical openings; the second cuttings are located on opposite ends of the finger holder and are created by removing material so as to form a pair of identical—in a mirror image fashion—semi-circular shapes.

In a preferred embodiment, there are two opposite end portions which are wider than the middle part of the finger holder which define the generally elliptical openings of the first cuttings so as to provide more room for passing an intended user's fingers.

In a preferred embodiment, the means for holding fingers forms an integral part of a cell phone removable casing accessory.

The means for holding fingers has a method of use consisting in the steps of having the intended user passing his fingers under a finger holder which deforms into an arcuate shape by pulling on a pair of compliant shapes located on opposite ends of the finger holder, which are forced to curve away from the casing and having the shape return to flat when the intended user's fingers are taken out from the finger holder.

In yet another preferred embodiment, the means for holding fingers is in the form of a stick-on accessory to be adhesively attached onto an existing removable cell phone casing.

The foregoing and other objects, features, and advantages of this invention will become more readily apparent from the following detailed description of a preferred embodiment with reference to the accompanying drawings, wherein the preferred embodiment of the invention is shown and described, by way of examples. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE SEVERAL VIEWS OF THE DRAWINGS

Other features and advantages of the present invention will become apparent when the following detailed description is read in conjunction with the accompanying drawings, in which:

FIGS. 3A-B Front and side views of the invention when deformed for passing fingers.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein.

Figure 1:
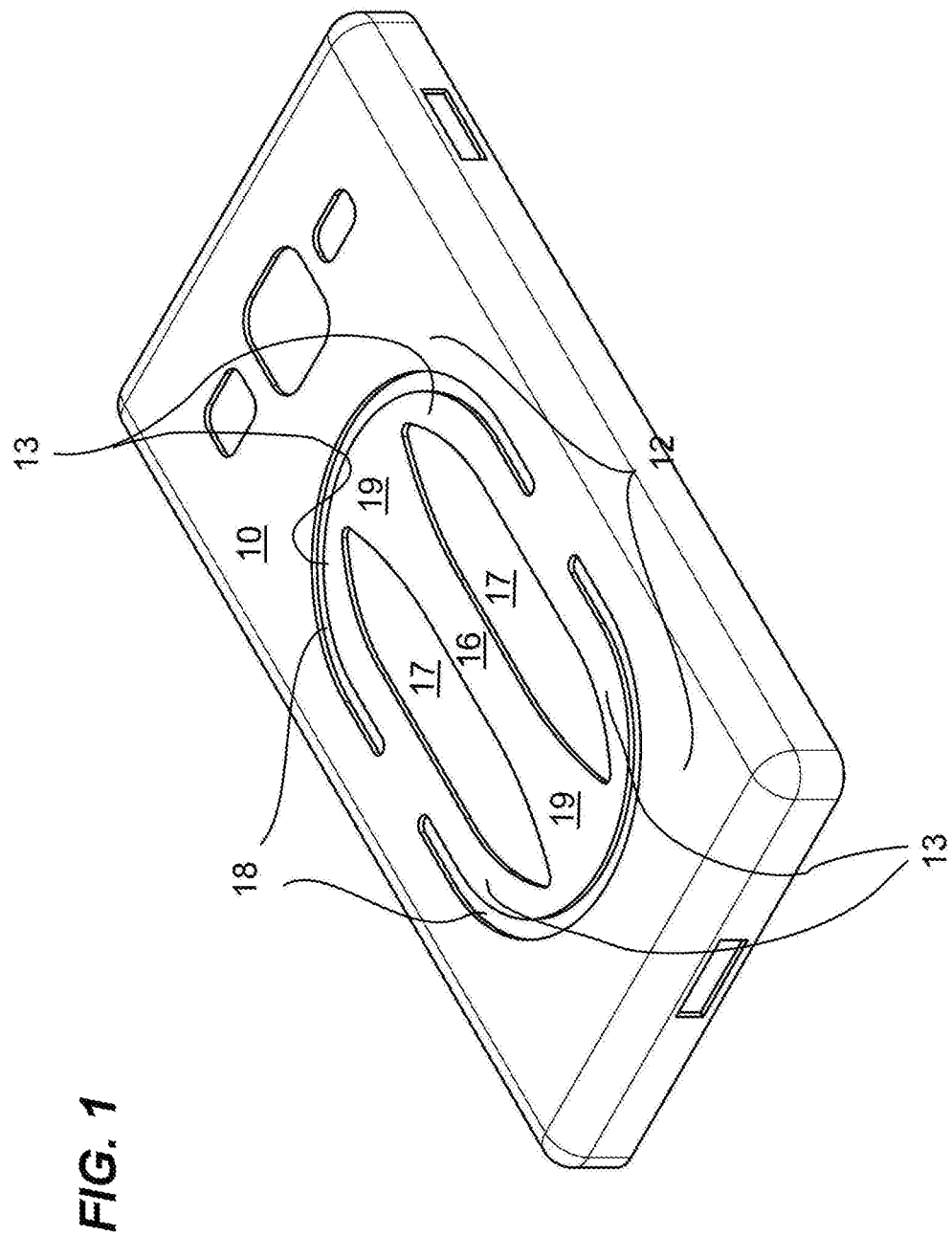
FIG. 1 is an isometric view according to an embodiment of the present invention.

Referring now to FIG. 1 there is provided a casing 10 having an embedded means for holding fingers 12 in the form of cut patterns made into a resiliently deformable material which causes the shape of the cut patterns to form a compliant mechanism. As best seen in FIGS. 3A-B, when in use, a user's fingers 14 pass under a finger holder 16 which deforms into an arcuate shape. The finger holder 16 is created by removing materials in a pair of first cuttings 17. The action of bringing a flat shape—the finger holder 16—into an arc reduces its length and causes that arc to pull on a pair of compliant shapes 13, located on opposite ends of the finger holder 16 which are forced to curve away from the casing 10. This double arc shape increases the size of area 21 where the fingers fit in, as seen in FIG. 3B, The pair compliant shapes 13 are created by removing material so as to form a pair of identical—in a mirror image fashion—semi-circular shapes to create the second cuttings 18, located at opposite ends of the finger holder 16. Because of the compliance of the material used in making the casing 10, the shape returns to flat when the fingers 14 are removed. And the process can be repeated for the life of the casing 10, which can probably exceed the lifespan of the phone it is used on.

The finger holder 16 has two opposite end portions 19 which are wider than the middle part of the finger holder 16, this helps in defining the generally oval shape of the first cuttings 17 and gives more room for passing the fingers 14.

Figure 2B:
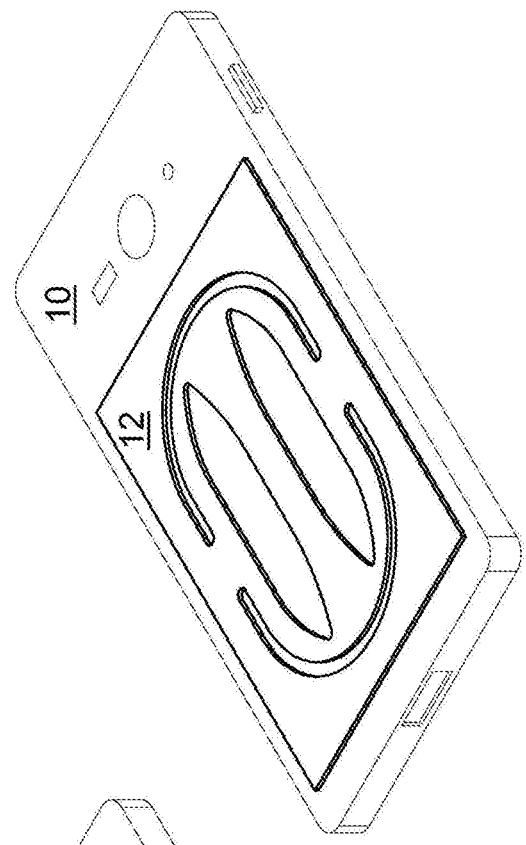
FIGS. 2A-B Isometric views of the invention as an accessory for existing casings.
Figure 2A:
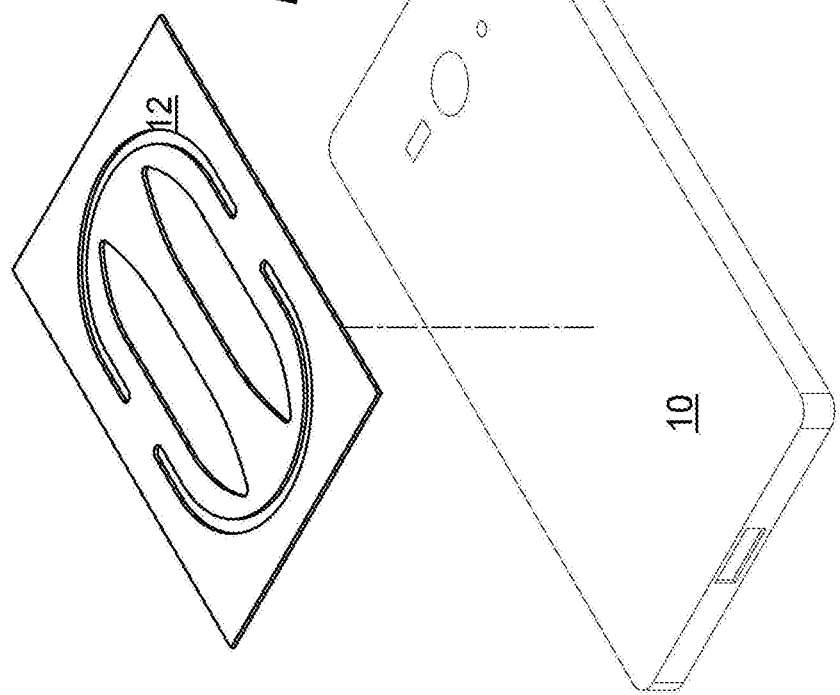

As shown in FIGS. 2A-B, the embedded means for holding fingers 12 can also be a stick-on accessory for existing casings 10.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A combination of a means for holding fingers and a cell phone wherein: a first and a second set of cut patterns made into a compliant resiliently deformable material are configured for modifying the material so as to bring a flat shape into an arcuate shape by pulling on a pair of compliant shapes located on opposite ends of the means for holding fingers thus forcing the compliant shapes to curve away from the casing and creating a double arc shape allowing intended user's fingers to engage the means for holding fingers; the first set of cut patterns is made by removing material so as to create two generally parallel and generally elliptical openings; the second set of cut patterns are located on opposite ends of the finger holder and are created by removing material so as to form a pair of identical—in a mirror image fashion—semi-circular shapes.

2. The combination of claim 1 wherein there are two opposite end portions which are wider than a middle part of the finger holder which define the generally elliptical openings of the first set of cut patterns so as to provide more room for passing the intended user's fingers.

3. The combination of claim 1 wherein the means for holding fingers forms an integral part of a cell phone removable casing accessory.

4. The combination of claim 1 wherein the means for holding fingers is in the form of a stick-on accessory to be adhesively attached onto an existing removable cell phone casing.

5. The combination of claim 4 wherein there are two opposite end portions which are wider than the middle part of the finger holder which define the generally elliptical openings of the first cuttings so as to provide more room for passing the intended user's fingers.

6. The combination of claim 4 wherein the means for holding fingers forms an integral part of a cell phone removable casing accessory.

* * * * *